United States Patent [19]
Ishihara et al.

[11] Patent Number: 5,498,457
[45] Date of Patent: Mar. 12, 1996

[54] MAGNETIC RECORDING MEDIUM HAVING A LUBRICANT LAYER COMPRISING IONICALLY INTERBONDED FLUOROPOLYETHERS WITH ACIDIC AND BASIC TERMINAL GROUPS

[75] Inventors: Heigo Ishihara, Tokyo; Takanori Kudo, Sayama, both of Japan

[73] Assignee: Hitachi, Ltd., Tokyo, Japan

[21] Appl. No.: 270,536

[22] Filed: Jul. 5, 1994

Related U.S. Application Data

[63] Continuation of Ser. No. 9,620, Jan. 27, 1993, abandoned.

[30] Foreign Application Priority Data

Jan. 27, 1992 [JP] Japan ................... 4-012145

[51] Int. Cl.$^6$ .................................................. G11B 5/00
[52] U.S. Cl. .................... 428/65.4; 428/336; 428/421; 428/422; 428/694 TF; 428/900
[58] Field of Search ................. 428/64, 65, 694, 428/900, 421, 422, 336, 694 TF, 65.4; 427/131

[56] References Cited

U.S. PATENT DOCUMENTS

| | | | |
|---|---|---|---|
| 3,778,308 | 12/1973 | Roller et al. | 117/234 |
| 3,919,719 | 11/1975 | Wright et al. | 360/134 |
| 4,268,556 | 5/1981 | Pedrotty | 428/65 |
| 5,037,710 | 8/1991 | Frew et al. | 428/695 |
| 5,091,249 | 2/1992 | Nishikawa et al. | 428/336 |
| 5,091,269 | 2/1992 | Kondo et al. | 428/695 |
| 5,093,211 | 3/1992 | Kudo et al. | 428/694 |
| 5,137,784 | 8/1992 | Suzuki et al. | 428/408 |

Primary Examiner—Stevan A. Resan
Attorney, Agent, or Firm—Kenyon & Kenyon

[57] ABSTRACT

A highly reliable rotary magnetic recording medium has a lubricating film layer on its surface, the lubricating film layer being composed of fluoropolyether having at least two acidic functional groups in one molecule as a lubricant and fluoropolyether having at least two basic functional groups in one molecule as another lubricant, where a stable network structure is formed on the surface of the magnetic recording medium by an appropriate combination of the lubricant having the acidic groups at the terminal ends of lubricant molecule and the lubricant having the basic groups at the terminal ends of lubricant molecule.

18 Claims, 1 Drawing Sheet

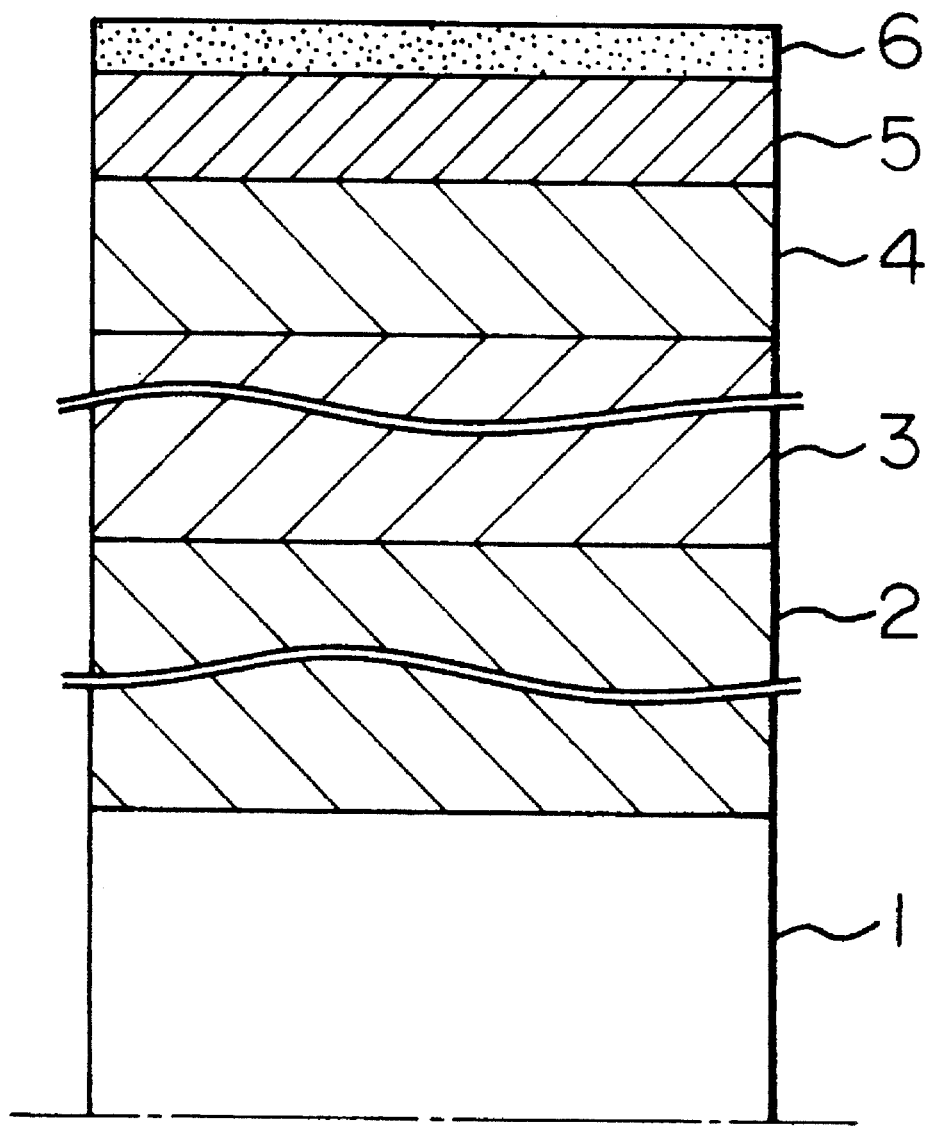

MAGNETIC RECORDING MEDIUM HAVING A LUBRICANT LAYER COMPRISING IONICALLY INTERBONDED FLUOROPOLYETHERS WITH ACIDIC AND BASIC TERMINAL GROUPS

This application is a continuation of application Ser. No. 08/009,620 filed 27 Jan. 1993, now abandoned.

BACKGROUND OF THE INVENTION

The present invention relates to a rotary magnetic recording medium capable of revolution such as a magnetic disc, etc. and a process for preparing the same, and particularly to a rotary magnetic recording disk with a lubricant of high reliability and a process for preparing the same.

Generally, a rotary magnetic recording medium such as a magnetic disk, etc. is in a structure comprising a substrate, a magnetic layer laid thereon and, if necessary, a protective layer laid on the magnetic layer. Such a magnetic recording medium suffers from wear by occasional contact with a magnetic head floating over the surface of the magnetic recording medium during the recording and reproduction, or from additional wear by dust generated by the wear caused by the occasional contact. The wear may lead to the protective layer or the magnetic layer being scraped away, resulting in a decrease in the recording or reproduction characteristics. To cope with this problem, it has been so far proposed and used to provide a lubricating film layer on the surface of the magnetic recording medium to give a wear resistance to the medium.

For example, it was proposed to use perfluoropolyether as a lubricant to improve the sliding characteristics (U.S. Pat. Nos. 3,778,308; 3,919,719; 4,268,556), or to use perfluoropolyether with an improved adhesiveness with respect to the lubricating film layer and the surface of magnetic recording medium by introducing polar groups such as $-CH_2OH$, $-COOR$, $-CONHR$, $-COOCH_3$, etc. and various functional groups to the terminal ends of perfluoropolyether [Japanese Patent Applications Kokai (Laid-open) Nos. 61-155345, 61-113126, 62-270019 and 2-101626]. As a result of these proposed improvements, a lubricating film layer of higher reliability has been available.

Generally, it is not satisfactory that the lubricating film layer for use in a rotary magnetic recording medium such as a magnetic disk, etc. have distinguished lubricating characteristics. That is, since a magnetic disk as a rotary magnetic recording medium is used for many revolutions over a long period of time, the lubricant will be scattered by a centrifugal force, etc. during the long this time, resulting in deterioration of the reliability of the lubricating film layer. To solve this problem, it has been attempted to use a lubricant having a high viscosity or a lubricant having functional groups, which have a good adhesiveness to the disk surface, at the terminal ends of one lubricant molecule. The characteristics have been improved to some extent by these lubricants, but satisfactory characteristics that can meet the demands of prolonged use have not been obtained yet.

SUMMARY OF THE INVENTION

The present invention provides a rotary magnetic recording medium with a lubricating film of high reliability, where actions of lubricant molecules on one another are improved and the scattering of the lubricant due to many revolutions over a long period of time is suppressed.

More particularly, the present rotary magnetic recording medium is characterized by a lubricating film layer formed by applying a mixture of a plurality of fluoropolyethers each having at least two acidic terminal groups or basic terminal groups in one molecule to the surface of the medium.

Furthermore, the present rotary magnetic recording medium is characterized by a lubricating film formed by ionic bonding of lubricant molecules to one another through their functional groups in the individual lubricant molecules to form a network of the lubricant molecules on the surface of the medium.

According to one embodiment of the present invention, a lubricant mixture comprises a combination of at least two kinds of lubricant molecules having different terminal groups from one another, but having the same basic skeleton of fluoropolyether.

Lubricant molecules in the lubricant mixture undergo ionic bonding of one to another through their functional groups of the lubricant molecules to form a network of the lubricant molecules.

For example, when a lubricant having acidic functional groups at both terminal ends in one lubricant molecule having the main chain structure of fluoropolyether represented by the following structural formula and another lubricant having basic functional groups at both terminals in one lubricant molecule having the same main chain skeleton as above are used in a combination, their mixture can be applied to the surface of a magnetic disk to form a lubricating film layer on the surface:

structural formula: 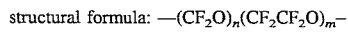

where m and n are integers

According to another characteristic of the present invention, a carboxyl group $CO_2H$ is used as a typical example of the acidic functional group, and an amino group $-CO_2NHCH_2CH_2NH_2$ as a typical example of the basic functional group, but the present invention is not limited to these two typical functional groups.

Specific lubricants for use in the present invention are given by the following formulae (1) and (2):

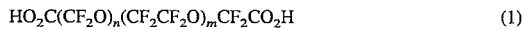 (1)

where m and n are integers.

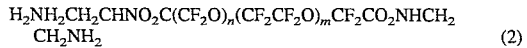 (2)

where m and n are integers.

The first lubricant represented by the formula (1) is fluoropolyether having carboxyl groups ($-CO_2H$) at both terminal ends in one molecule. The second lubricant represented by the formula (2) is fluoropolyether having amino groups ($-NH_2$) at both terminal ends in one molecule. The present magnetic disk has a lubricating film layer formed from a combination of these first and second lubricants. In the lubricating film layer, the carboxyl groups and amino groups of these two lubricant molecules are gradually converted to amine salts. By conversion to the amine salts, the lubricant molecules can have a strong action on one another to form a network of ionic bonding of the lubricant molecules. Furthermore, if the lubricant molecules have excess functional groups, the excess functional groups have a function to act as groups adsorbable onto the disk surface. By these two actions, i.e. the network of ionic bonding and adsorption through the excess functional groups, scattering of lubricants by a centrifugal force can be suppressed. The scattering of lubricants is a phenomenon extending over a long time. Even if there is no sufficient time that the molecular network has been formed right after the application of the lubricants, satisfactory characteristics can be obtained through gradual formation of strong bonds in the lubricating film.

As is apparent from the above-mentioned principles of the present invention, the lubricant molecules for use in the present invention must have at least two functional groups in one molecule for forming a molecular network, and the lubricants can have excess functional groups capable of undergoing adsorption onto or bonding to the disk surface.

The lubricants can be applied to a rotary magnetic recording medium, for example, by spin coating, spray coating or dip coating. In the present invention, an appropriate combination of lubricants having at least two kinds of lubricant molecules having different terminal groups in one molecule is used. In the formation of a lubricating film, a mixture of these lubricants can be applied in one run, and in the case of spray coating etc., individual lubricants can be applied to the medium separately and alternately one after another in several runs, where interfaces between individual lubricating films are formed by ionic bonding by the acidic terminal groups and the basic terminal groups and form salts of the acidic terminal groups and the basic terminal groups.

The present lubricating film layer has a suitable thickness range for giving a satisfactorily good coated state and for a high density recording, and a preferable thickness range is 10 to 200 Å. The lower limit 10 Å of thickness range is a limit set by the molecular width of lubricants represented by the above-mentioned formulae (1) and (2), and the upper limit 200 Å is a limit set by the necessary height for the magnetic head floating. However, since scattering of the lubricating film can be suppressed not only by the adhesiveness of lubricant molecules to the disk surface, but also by the intermolecular force of lubricant molecules, a lubricating film layer thickness of more than 200 Å can be also effective.

Still further advantages of the present invention will become apparent to those of ordinary skill in the art upon reading and understanding the following detailed description of the preferred and alternate embodiments.

BRIEF DESCRIPTION OF THE DRAWING

The invention will be described in conjunction with a single drawing which is only for the purpose of illustrating the preferred and alternate embodiments of the present invention, and not for the purposes of limiting the present invention, wherein The single FIGURE is a cross-sectional view of a magnetic recording medium according to one embodiment of the present invention.

DETAILED DESCRIPTION

The present invention will be described in detail below, referring to Examples and the single drawing FIGURE.

Lubricants used in the following Examples of the present invention have the structures given in the following Table 1.

TABLE 1

| No. | Lubricant |
|---|---|
| 1 | $HO_2C(CF_2O)_n(CF_2CF_2O)_mCF_2CO_2H$ <br> (Average molecular weight: 2000, m/n = about 0.7) |
| 2 | $H_2NH_2CH_2CHNO_2C(CF_2O)_n(CF_2CF_2O)_mCF_2CO_2NHCH_2CH_2NH_2$ <br> (Average molecular weight: 2000, m/n = about 0.7) |
| 3 | $F[CF(CF_2)CF_2O]_nC_2F_5$ <br> (Average molecular weight: 9300) |
| 4 | $HOCH_2F_2CO(CF_2O)_2(CF_2CF_2O)_mCF_2CH_2OH$ <br> (Average molecular weight: 2000, m/n = about 1.0) |

In Table 1, the lubricant No. 1 has the following basic structure:

$$-(CF_2O)_n(CF_2CF_2O)_mCF_2-$$

The lubricant No. 1 takes carboxyl groups $CO_2H$ as acidic functional groups at both terminal ends in one molecule.

In Table 1, the lubricant No. 2 has the following basic structure:

$$-(CF_2O)_n(CF_2CF_2O)_mCF_2-$$

The lubricant No. 2 takes amino groups $CO_2NHCH_2CH_2NH_2$ as basic amino groups at both terminal ends in one molecule.

In Table 1, the lubricant No. 3 is perfluoropolyether having the following basic structure:

$$-[CF(CF_3)CF_2O]_n-$$

The lubricant No. 3 has fluorines (-F) as characteristic groups and has not any functional group, and has been so far widely used.

In Table 1, the lubricant No. 4 has the following basic structure:

$$-F_2CO(CF_2O)_n(CF_2CF_2O)_mCF_2-$$

The lubricant No. 4 takes hydroxyl groups $CH_2OH$ at both terminal ends in one molecule, and has been so far widely used, where the hydroxyl groups act as alcoholic functional groups.

Single FIGURE is a structural view of a magnetic recording disk according to one embodiment of a rotary magnetic recording medium of the present invention.

As shown in FIGURE, a first underlayer film 2 is formed on a substrate 1, 5 inches in diameter, composed of an aluminum (Al) alloy by plating NiP to a film thickness of 10 to 12 μm. A second underlayer film 3 (Cr film) is formed on the first underlayer film 2 by high frequency sputtering in an Ar gas. In this embodiment, the underlayer film 3 has a film thickness of 0.25 μm. A metallic magnetic film 4 is formed on the second underlayer film 3 and is composed of a Co—Ni—Zr structure. The metallic magnetic film 4 has a film thickness of 0.06 μm. The metallic magnetic film 4 can be formed by sputtering or metal vapor deposition, or by other methods, if they are suitable for forming a metallic magnetic film.

In this embodiment, a protective film 5 is formed on the metallic magnetic film and is a carbon film having a film thickness of 0.04 μm. A lubricating film 6 is formed on the protective film 5, and is composed from various materials shown in the following Examples and Comparative Examples.

EXAMPLE 1

Lubricant No. 1 and lubricant No. 2 as shown in Table 1, were mixed in a ratio of 1:1 by weight and applied to the protective layer 5 as a lubricating film 6, as shown in Single FIGURE, to a thickness of 0.012 μm (120 Å). In this Example 1, the lubricating film 6 was a mixture of fluoropolyether having acidic groups (—$CO_2H$) and fluoropolyether having basic groups (—$CO_2NHCH_2CH_2NH_2$) as lubricant molecules. The lubricants could be applied to the protective layer by, for example, spin coating, spray coating or dip coating. In this Example 1, a combination of lubricants (1) and (2) having different terminal groups was used. In the formation of the lubricating film layer, their mixture can be applied in one run or the individual lubricants can be applied to the protective layer one after another separately in several runs, when the application is made by spray coating, etc.

The film thickness of lubricating film layer 6 was measured by a Fourier conversion-type, infrared spectrometer (which will be hereinafter referred to as FT-IR). Scattering of the lubricating film layer by revolutions of the magnetic disk was evaluated by measuring a change with time in the thickness of the lubricating film layer by FT-IR at a high speed revolutions, i.e. at 12,000 rpm. The percent retaining of the lubricating film layer after the revolutions for 1,000 hours was found to be 99.1%. The test results of Example 1 are shown in Table 2 as Example No. 1

TABLE 2

| Ex. No. | Comp. Ex. No. | Lubricants and composition (% by weight) | Lubricating film layer thickness (Å) | Percent retaining of lubricating film layer (%) |
|---|---|---|---|---|
| 1 | | (1) 50%, (2) 50% | 120 | 99.1 |
| 2 | | (1) 35%, (2) 35%, (3) 30% | 105 | 98.3 |
| | 1 | (1) 50%, (4) 50% | 124 | 62.5 |
| | 2 | (1) | 110 | 70.3 |
| | 3 | (2) | 113 | 42.0 |

Remark: The percent retaining of a lubricating film layer is a value after revolutions for 1,000 hours.

EXAMPLE 2

Lubricants (1) and (2) shown in Table 1 were mixed in a ratio of 1:1 by weight, and 30% by weight of lubricant (3) (on the basis of total mixture) was added to the mixture. The lubricating film layer 6 having a film thickness of 0.0105 μm (105 Å) was formed on the protective layer 5, as shown in the single drawing FIGURE. In this Example 2, the lubricating film layer 6 was composed of a combination of fluoropolyether having acidic groups (—$CO_2H$) (1), fluoropolyether having basic groups (—$CO_2NHCH_2CH_2NH_2$) (2), and the conventional lubricant (3) as lubricant molecules. The test results of this Example 2 are shown in Table 2 as Example No. 2. The percent retaining of the lubricating film layer after revolutions for 1,000 hours was 93.8%. The same evaluation procedure, etc. as in Example 1 were used in this Example 2.

Comparative Example 1

Lubricant (1) and lubricant (4), as shown in Table 1, were mixed in a ratio of 1:1 by weight, and the mixture was applied to the protective film 5 to a film thickness of 0.0124 μm (124 Å) as the lubricating film layer 6. The lubricating film layer 6 of this Comparative Example 1 was composed of a combination of a lubricant having acidic functional groups (1) and another lubricant having substantially neutral functional groups (4). The test results of this Comparative Example 1 are shown in Table 2 as Comparative Example No. 1. The present retaining of the lubricating film layer after revolutions for 1,000 hours was 62.5%. The same evaluation procedure, etc. as in Example 1 were used in this Comparative Example 1.

Comparative Example 2

Lubricant (1), as shown in Table 1, was applied to a film thickness of 0.0110 μm (110 Å) as the lubricating film layer 6 as shown in the single drawing FIGURE. The lubricating film layer 6 of this Comparative Example 2 was composed only of fluoropolyether having acidic functional groups (1). The test results of this Comparative Example 2 are shown in Table 2 as Comparative Example No. 2. The percent retaining of the lubricating film layer after revolutions for 1,000 hours was 70.3%. The same evaluation procedure, etc. as in Example 1 were used.

Comparative Example 3

Lubricant (2), as shown in Table 1, was applied to a film thickness of 0.0113 μm (113 Å) as the lubricating film layer 6 as shown in the single drawing FIGURE. The lubricating film layer 6 of this Comparative Example 3 was composed only of fluoropolyether having basic functional groups (2). The test results of this Comparative Example 3 are shown in Table 2 as comparative Example No. 3. The percent retaining of the lubrication film layer after revolutions for 1,000 hours was 42.0%. The same evaluation procedure, etc. as in Example 1 were used in this Comparative Example 3.

As is evident from Table 2, magnetic recording disks provided with the lubricating film layer 6 composed of a combination of fluoropolyether having acidic groups (carboxyl groups) and fluoropolyether having basic groups (amino groups) as lubricant molecules, as shown in Examples Nos. 1 and 2, have considerably less reduction in the lubricating film layer thickness by revolutions than magnetic recording disks provided with the lubricating film layer 6 without such a combination, as shown in Comparative Examples No. 1, 2 and 3. It seems that a network of ionic bonding through lubricant molecules contributes to the considerably less reduction. That is, when a lubricating film layer is formed from a combination of fluoropolyether having carboxyl groups (—$CO_2H$) at both terminal ends in one molecule as one lubricant and fluoropolyether having amino group (—$NH_2$) at both terminal ends in one molecule as another lubricant, the carboxyl groups and the amino groups of these two lubricant molecules are gradually converted to amine salts. Thus, the lubricant molecules strongly act on one another to form a network of ionic bonding through the lubricant molecules. Furthermore, excess functional groups of the lubricant molecules act as groups adsorbable onto the disk surface. By these two actions, scattering of the lubricating film layer by a centrifugal force can be suppressed.

In Example 2, the lubricating film layer 6 is formed from a combination of lubricants (1) and (2) capable of making a network of ionic bonding, as mentioned above, which further contains lubricant (3), i.e. perfluoropolyether having no functional groups.

The results of Example No. 2 in Table 2 show much better percent retaining of lubricating film layer than those of Comparative Examples Nos. 1 to 3. It can be seen from this fact that scattering of lubricant (3) without the functional groups can be suppressed by the network of ionic bonding through the lubricant molecules.

Examples 1 and 2 have been explained with respect to fluoropolyether having two carboxyl groups at both terminal ends in one molecule, and the present invention is not limited thereto. That is, fluoropolyethers having three or more carboxyl groups in one molecule are also effective in the present invention.

Fluoropolyether having three or more carboxyl groups in one molecule includes a lubricant represented by the following formula (3):

$$\text{HOOCCH}_2\text{CH}_2\underset{\underset{\text{COOH}}{|}}{\text{CH}}\text{CH}_2\text{CH}_2\text{O}_2\text{C}(\text{CF}_2\text{O})_n(\text{CF}_2\text{CF}_2\text{O})_m\text{CF}_2\text{CO}_2\text{CH}_2\text{CH}_2\underset{\underset{\text{COOH}}{|}}{\text{CH}}\text{CH}_2\text{CH}_2\text{COOH} \qquad (3)$$

where m and n are integers.

Furthermore, Examples 1 and 2 have been also explained with respect to fluoropolyether having two basic amino groups at both ends in one molecule, and the present invention is not limited thereto. Fluoropolyethers having three or more amino groups in one molecule are also effective in the present invention.

Fluoropolyethers having three or more amino groups in one molecule include a lubricant represented by the following formula (4):

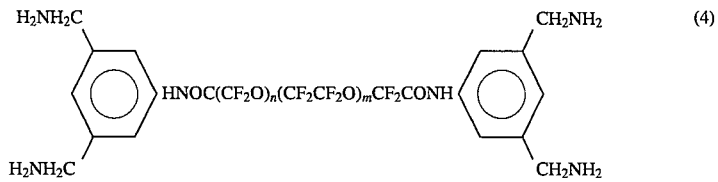

where m and n are integers.

Examples 1 and 2 show an acidic functional group (—COOH), but the present invention is not limited thereto. For example, the following acidic functional groups can be used in the present invention:

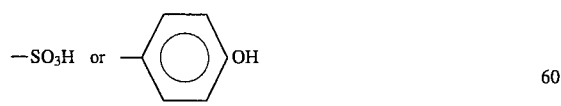

Examples 1 and 2 show a basic functional group (—NH$_2$), but the present invention is not limited thereto. For example, the following basic functional groups can be used in the present invention:

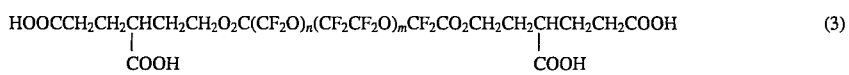

where R is an alkyl group

As is obvious from the foregoing, the magnetic recording media shown in Examples 1 and 2 had a good lubricant retainability and a distinguished reliability as a magnetic recording medium. The magnetic recording disk apparatus provided with the present magnetic recording disk had a good reliability, because the lubricating film layer could be retained on the disk surface for a long time.

The present invention is applicable to a rotary magnetic recording medium such as a magnetic recording disk. The magnetic recording medium comprises a substrate and a magnetic film layer formed on the substrate, and, if required, a protective film layer formed on the magnetic film layer. The lubricating film layer is directly related to the magnetic film layer or the protective film layer. The effect of the present invention depends on the actions of lubricant molecules on one another and thus the present invention can be applied to all the conventional magnetic recording media having a magnetic film layer and further a protective film layer.

As explained in detail above, the present rotary magnetic recording medium has a lubricating film layer that resists scattering otherwise due to a centrifugal force generated by revolutions of the magnetic recording disc, etc. through a stable network structure formed in the lubricating film layer by an appropriate combination of a lubricant having acidic groups at terminal ends in one molecule and another lubricant having basic groups at terminal ends in one molecule.

Thus, the present rotary magnetic recording medium has a good reliability over a long time.

What is claimed is:

1. A magnetic disk comprising:

a substrate; a magnetic layer provided on the substrate; and a lubricating film layer provided on the magnetic layer, the lubricating film layer comprising first fluoropolyethers each having at least two acidic terminal groups as functional groups and second fluoropolyethers each having at least two basic terminal groups as functional groups, wherein the first and second fluoropolyethers are ionically bonded to one another to form an ionically interbonded molecular chain structure when the first and second fluoropolyethers each have two functional groups or to form a molecular network structure when either the first or second fluoropolyethers each have at least three functional groups, while one or more of the remaining functional groups of the first and second fluoropolyethers function as adsorbable groups on the surface of the magnetic disk.

2. A magnetic disk recording medium according to claim 1, wherein the fluoropolyethers have a main chain structure represented by the following general formula:

$$-(CF_2O)_n(CF_2CF_2O)_m-$$

wherein m and n are integers.

3. A magnetic disk according to claim 1, wherein the acidic terminal groups are carboxyl groups and the basic terminal groups are amino groups.

4. A magnetic disk according to claim 3, wherein the lubricating film layer is capable of forming amine salts.

5. A magnetic disk according to claim 1, wherein the lubricating film layer has a thickness of 10 to 200 Å.

6. A magnetic disk according to claim 1, wherein the lubricating thin film layer is formed on a protective film provided on the magnetic film.

7. A magnetic disk according to claim 1, wherein the first and second fluoropolyethers form salts through the ionic bonding of the acidic terminal groups and the basic terminal groups.

8. A magnetic disk according to claim 1, wherein the first and second fluoropolyethers form individual layers alternately and interfaces between the individual layers are formed by the ionic bonding of the acidic terminal groups and the basic terminal groups.

9. A magnetic disk according to claim 1, wherein the first and second fluoropolyethers form individual layers alternately, and interfaces between the individual layers are formed by the ionic bonding through salt formation of the acidic terminal groups and the basic terminal groups.

10. A magnetic disk comprising:

a substrate; a magnetic layer provided on the substrate; and a lubricating film layer provided on the magnetic layer, the lubricating film layer comprising first fluoropolyethers each having two acidic terminal groups as functional groups in the molecule and second fluoropolyethers each having two basic terminal groups as functional groups in the molecule, wherein the first and second fluoropolyethers are alternately ionically bonded to one another to form an ionically interbonded molecular chain structure.

11. A magnetic disk according to claim 10, wherein the fluoropolyethers have a main chain structure represented by the following general formula:

$$-(CF_2O).(CF_2CF_2O)_m-$$

wherein m and n are integers.

12. A magnetic disk according to claim 10, wherein the acidic terminal groups are carboxyl groups and the basic terminal groups are amino groups.

13. A magnetic disk according to claim 10, wherein the lubricating film layer forms amine salts.

14. A magnetic disk according to claim 10, wherein the lubricating film layer has a thickness of 10 to 200 Å.

15. A magnetic disk according to claim 10, wherein the lubricating thin film layer is formed on a protective film provided on the magnetic film.

16. A magnetic disk according to claim 10, wherein the first and second fluoropolyethers form salts through the ionic bonding of the acidic terminal groups and the basic terminal groups.

17. A magnetic disk according to claim 10, wherein the first and second fluoropolyethers form individual layers alternately and interfaces between the individual layers are formed by the ionic bonding of the acidic terminal groups and the basic terminal groups.

18. A magnetic disk according to claim 10, wherein the first and second fluoropolyethers form individual layers alternately, and interfaces between the individual layers are formed by the ionic bonding through salt formation of the acidic terminal groups and the basic terminal groups.

* * * * *

UNITED STATES PATENT AND TRADEMARK OFFICE
CERTIFICATE OF CORRECTION

PATENT NO. : 5,498,457
DATED : March 12, 1996
INVENTOR(S) : Heigo Ishihara et al.

It is certified that error appears in the above-indentified patent and that said Letters Patent is hereby corrected as shown below:

| Column | Line | | |
|---|---|---|---|
| 1 | 51 | Delete "the long". | |
| 3 | Table 1, No. 4: | Change "...$(CF_2O)_2$..." to --...$(CF_2O)_n$...--. | |
| 6 | 1 | Change "93.8%" to --98.3%--. | |
| 8 | 64 | Delete "each". | |
| 9 | 1 | Delete "recording medium". | |
| 10 | 9 | Change "$-(CF_2O).($..." to -- $-(CF_2O)_n($...--. | |

Signed and Sealed this

Tenth Day of September, 1996

Attest:

BRUCE LEHMAN

*Attesting Officer*       *Commissioner of Patents and Trademarks*